(12) United States Patent
Foerster et al.

(10) Patent No.: US 10,459,001 B2
(45) Date of Patent: Oct. 29, 2019

(54) METHOD FOR DETERMINING AT LEAST ONE SPEED IN A RAIL VEHICLE

(71) Applicant: SIEMENS MOBILITY GMBH, Munich (DE)

(72) Inventors: Till Foerster, Fuerth (DE); Stefan Hassler, Kirchenthumbach (DE); Thorsten Stuetzle, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 497 days.

(21) Appl. No.: 14/893,955

(22) PCT Filed: May 26, 2014

(86) PCT No.: PCT/EP2014/060772
§ 371 (c)(1),
(2) Date: Nov. 25, 2015

(87) PCT Pub. No.: WO2014/195162
PCT Pub. Date: Dec. 11, 2014

(65) Prior Publication Data
US 2016/0109476 A1    Apr. 21, 2016

(30) Foreign Application Priority Data

Jun. 4, 2013   (DE) .................. 10 2013 210 361

(51) Int. Cl.
*G01P 7/00*     (2006.01)
*G01P 21/02*    (2006.01)
(Continued)

(52) U.S. Cl.
CPC ............... *G01P 7/00* (2013.01); *B60T 8/172* (2013.01); *B60T 8/1705* (2013.01);
(Continued)

(58) Field of Classification Search
CPC .......... G01P 7/00; G01P 21/02; B60T 13/665; B60T 8/1705; B60T 8/172; B60T 2250/04
See application file for complete search history.

(56) References Cited

U.S. PATENT DOCUMENTS 3,744,849 A    7/1973  Jonason et al.
4,835,693 A    5/1989  Smith et al.
(Continued)

FOREIGN PATENT DOCUMENTS

CN    1894116 A     1/2007
CN    101509936 A   8/2009
(Continued)

OTHER PUBLICATIONS

Ernest P. et al: "Train Locator Using Inertial Sensors and Odometer"; 2004 IEEE Intelligent Vehicles Symposium University of Parma; Parma/ Italien; Jun. 14-17, 2004; 0-7803-8310-9/04; 2004 IEEE, pp. 860-865.

(Continued)

*Primary Examiner* — Mohamed Charioui
*Assistant Examiner* — Eyob Hagos
(74) *Attorney, Agent, or Firm* — Laurence Greenberg; Werner Stemer; Ralph Locher

(57) ABSTRACT

A speed of a rail vehicle equipped with a first chassis unit is determined. A chassis speed measurement variable is provided by a sensor unit. Inertial measurement variables are detected by an inertial measurement unit; a reference speed characteristic value is formed; an inertial speed characteristic value is determined by a calculation unit based on the inertial measurement variables, in a first operating mode, to estimate a deviation in the inertial calculation based on the reference speed characteristic value; the inertial speed characteristic value is determined, in a second operating mode, without taking into account the reference speed character- (Continued)

istic value. If an anomalous provision process of the chassis speed measurement variable is detected by a recognition unit on the basis of a reference characteristic value and the chassis speed measurement value, the inertial calculation is performed according to the second operating mode.

16 Claims, 8 Drawing Sheets

(51) Int. Cl.
*B60T 8/17* (2006.01)
*B60T 8/172* (2006.01)
*B60T 13/66* (2006.01)

(52) U.S. Cl.
CPC ............ *B60T 13/665* (2013.01); *G01P 21/02* (2013.01); *B60T 2250/04* (2013.01)

(56) References Cited

U.S. PATENT DOCUMENTS

| | | | | |
|---|---|---|---|---|
| 4,896,090 | A * | 1/1990 | Balch | B60L 3/102 318/52 |
| 5,719,770 | A | 2/1998 | Matsuno | |
| 5,787,384 | A | 7/1998 | Johnson | |
| 6,148,269 | A | 11/2000 | Kumar et al. | |
| 6,600,979 | B1 * | 7/2003 | Kumar | B60T 8/172 180/197 |
| 6,816,804 | B1 | 11/2004 | Lee | |
| 8,041,491 | B2 | 10/2011 | Tan | |
| 2001/0035049 | A1 * | 11/2001 | Balch | B60L 3/10 73/488 |
| 2004/0153216 | A1 | 8/2004 | Tan | |
| 2005/0137761 | A1 | 6/2005 | Lungu | |
| 2007/0067112 | A1 | 3/2007 | Fiedler et al. | |
| 2008/0306687 | A1 | 12/2008 | Ryu et al. | |
| 2009/0205401 | A1 | 8/2009 | Munko et al. | |
| 2009/0326733 | A1 * | 12/2009 | Abele | B60T 8/172 701/1 |
| 2015/0142390 | A1 | 5/2015 | Steinhardt et al. | |
| 2016/0109476 | A1 | 4/2016 | Foerster et al. | |

FOREIGN PATENT DOCUMENTS

| | | |
|---|---|---|
| CN | 201397343 Y | 2/2010 |
| DE | 2051899 A1 | 5/1971 |
| DE | 2401363 A1 | 7/1975 |
| DE | 2741883 A1 | 3/1979 |
| DE | 2813078 B1 | 4/1979 |
| DE | 3739271 A1 | 6/1989 |
| DE | 19527531 A1 | 2/1996 |
| DE | 102005001403 A1 | 7/2006 |
| DE | 102007030987 A1 | 1/2009 |
| DE | 102008026370 B4 | 8/2011 |
| DE | 102010045720 A1 | 3/2012 |
| DE | 102013210361 A1 | 12/2014 |
| EP | 0280524 A2 | 8/1988 |
| EP | 2981832 A1 | 2/2016 |
| EP | 2981832 B1 | 6/2017 |
| GB | 1492188 A | 11/1977 |
| GB | 2454594 A | 5/2009 |
| WO | 8912234 A1 | 12/1989 |
| WO | 2008071498 A1 | 6/2008 |
| WO | 2013037855 A1 | 3/2013 |
| WO | 2014195162 A1 | 12/2014 |

OTHER PUBLICATIONS

"Vehicle speed estimation technique"; pp. 1-21.
Allotta B. et al: "Evaluation of odometry algorithm performances using a railway vehicle dynamic model"; Vehicle System Dynamics vol. 50; No. 5; May 2012; pp. 699-724.
Tanelli M. et al: "Longitudinal Vehicle Speed Estimation for Traction and Braking Control Systems"; Proceedings of the 2006 IEEE; International Conference on Control Applications; Munich, Germany; Oct. 4-6, 2006 0-7803-9796-7 /06; 2006 IEEE; pp. 2790 -2795.
Hemerly E. et al: "Implementation of a GPS/INS/Odometer Navigation System"; ABCM Symposium Series in Mechatronics—vol. 3; pp. 519-524, 2008 ABCM; 2008.
Bevly D. et al: "The Use of GPS Based Velocity Measurements for Improved Vehicle State Estimation"; Proceedings of the American Control Conference; Chicago; Illinois; Jun. 2000; 0-7803-5519-9/ 00:2000 AACC pp. 2538-2542.
Malvezzi M. et al: "Train Position and Speed Estimation by Integration of Odometers and IMUs"; 9th World Congress on Railway Research; Lille, France; May 22-26, 2011.
Daiss A. et al: "Estimation of Vehicle Speed Fuzzy-Estimation in Comparison with Kalman-Filtering"; 0-7803-2550-8/95; 1995 IEEE; pp. 281-284.
Wenbo, Chu et al; "Speed Estimation for All-wheel Drive Vehicles Based on Multi-information Fusion"; Tsinghua University; College of Automotive Engineering, Jilin University, Changchun; pp. 1-10.
Mázl R. et al: "Sensor Data Fusion for Inertial Navigation of Trains in GPS-dark areas"; 0-7803-7848-2/03; 2003 IEEE; pp. 345-350.
Mirabadi A. et al: "Application of Sensor Fusion to Railway Systems"; 0-7803-3700-X/96; 1996 IEEE; pp. 185-192.
Lijun, Wu et al; "A Method of Vehicle Speed Estimation based on Acceleration and Wheel Speed Information"; Jilin University; Institute of Electrical Engineering; pp. 1-9.
Saab S. et al: "Compensation of Axle-Generator Errors Due to Wheel Slip and Slide"; IEEE Transactions on Vehicular Technology, vol. 51, No. 3, May 2002, 0018-9545/02; 2002 IEEE; pp. 577-587.

* cited by examiner

METHOD FOR DETERMINING AT LEAST ONE SPEED IN A RAIL VEHICLE

BACKGROUND OF THE INVENTION

Field of the Invention

The invention relates to a method for determining at least one speed in a rail vehicle equipped with at least one first chassis unit, in which at least one chassis speed measurement variable based on the first chassis unit is provided by means of at least one sensor unit assigned to the first chassis unit.

The vehicle travel speed is used in a multiplicity of applications in rail vehicles. A typical example is a braking process which is matched to the instantaneous travel speed. Nowadays, the braking system increasingly consists of at least one electrodynamic brake and a pneumatic brake equipped with slide and skid protection. Future braking systems are preferably intended to consist only of an electrodynamic brake and another braking device, in particular a spring-loaded brake, in which case the use of a fully adequate pneumatic brake which is expensive with regards to the costs and the installation space is dispensed with.

In order to meet the requirements prescribed for reliable rapid and emergency braking of such systems, redundancy levels are provided for controlling an electrodynamic brake formed by at least one chassis motor, in which case changing between redundancy levels and possibly activation of the other braking device, for example a spring-loaded brake of chassis, must be based on a speed recording which is as exact as possible and is considered to be reliable. In addition, the performance of a reliable slide and skid protection function is based on an accurate determination of the speed.

It is known practice to determine the speed of a chassis unit in the form of a bogie using a rotational speed sensor on a bogie motor or on the wheel axle driven by the latter. In some operating situations, in particular in the event of slipping or sliding or skidding of the wheel axle, the bogie speed recorded on the basis of the wheel speeds deviates from the travel speed of the rail vehicle or the further bogies. This can have a disadvantageous effect on the performance of a slide and skid protection function. In addition, changing of the redundancy levels provided for controlling a bogie motor used as an electrodynamic brake or the activation of another braking device of the bogie may be impeded or defective.

BRIEF SUMMARY OF THE INVENTION

The invention is based on the object of providing a method for determining at least one speed in a rail vehicle, by means of which a particularly reliable determination, in particular a determination which is considered to be safe, can be achieved.

For this purpose, it is proposed that
- inertial measurement variables are recorded by an inertial measuring unit,
- a reference speed characteristic variable is formed on the basis of the chassis speed measurement variable,
- an inertial speed characteristic variable is determined, by means of an inertial calculation carried out by at least one computing unit, at least on the basis of the inertial measurement variables and—during at least one period according to a first operating mode—on the basis of the reference speed characteristic variable in order to estimate a deviation in the inertial calculation,
- the inertial speed characteristic variable is determined, by means of the inertial calculation, at least on the basis of the inertial measurement variables and—during at least one period according to a second operating mode—without taking into account the reference speed characteristic variable,
- an abnormal process of providing the chassis speed measurement variable can be detected on the basis of a reference characteristic variable and the chassis speed measurement variable, and
- the inertial calculation is carried out according to the second operating mode if an abnormal provision process is present.

This makes it possible to considerably reduce, in particular avoid, the influence of an abnormal process of providing the chassis speed measurement variable on the determination of a speed of the rail vehicle. This can be achieved, in particular, by virtue of the fact that the chassis speed measurement variable is not directly included in this determination, but rather in combination with inertial measurement variables which are independent per se of dynamics of the chassis unit which result in possibly defective recording of measurement variables, and the inclusion of the chassis speed measurement variable is adjusted following detection of an abnormal provision process which may be caused, for example, by sliding or skidding of the chassis unit, an incorrect measurement by the sensor unit or faulty transmission of output data from the latter. The chassis speed measurement variable can therefore be advantageously used to support the inertial calculation, in which case a negative influence caused by possible errors inherent in the recording of this chassis speed measurement variable can be advantageously counteracted by the proposed measure.

A "chassis unit" is intended to be understood as meaning, in particular, an assembly of the rail vehicle which has at least one wheel in contact with a rail. The chassis unit preferably corresponds to a bogie which is equipped, in particular, with a drive motor, which is expediently used as an electrodynamic brake in a braking process, and/or another braking device, for example a spring-loaded brake. However, it may correspond to an individual wheel axle or an individual wheel which is preferably coupled to such a drive motor and/or is equipped with such a braking device.

In order to "provide" the chassis speed measurement variable, the sensor unit has at least one sensor for recording a measurement variable which corresponds to the chassis speed measurement variable or is processed to form the latter by means of a further characteristic variable. The sensor expediently carries out at least one measurement process on at least one wheel of the chassis unit or on a drive element which is mechanically coupled to said wheel, in particular is rigidly mechanically coupled to said wheel, and is intended to drive the wheel, in particular a wheel axle or an element of a drive motor. In this case, the measurement variable is at least one characteristic variable influenced by the wheel dynamics. In one preferred embodiment of the invention, the at least one sensor of the sensor unit is in the form of a rotational speed sensor, the chassis speed measurement variable corresponding to a rotational speed or a variable proportional to a rotational speed. At least one further parameter, in particular a wheel diameter characteristic variable, can be used to form the chassis speed measurement variable on the basis of the measurement variable. If the chassis unit comprises a plurality of wheels, the sensor unit may have a plurality of sensors each assigned to a different wheel, the outputs of the sensors being used to provide the chassis speed measurement variable. The latter can be provided in this case by means of an averaging over the individual wheels of the chassis unit.

The reference speed characteristic variable can be formed on the basis of the chassis speed measurement variable by virtue of the fact that it corresponds to the chassis speed measurement variable or to the chassis speed measurement variable multiplied by a factor independent of the wheel or rail vehicle dynamics or by virtue of the fact that it is linked to a further speed characteristic variable.

The abnormal provision process can be detected, in particular, by comparing the chassis speed measurement variable with the reference characteristic variable. A threshold value may be preset for this purpose, in particular, a difference formed with the chassis speed measurement variable and the reference characteristic variable being compared with this threshold value. This makes it possible to easily detect a significant deviation of the chassis speed measurement variable from the reference characteristic variable, which deviation indicates an abnormal provision process. The determined inertial speed characteristic variable can be used, in particular, as the reference characteristic variable.

A "speed characteristic variable" is intended to be understood as meaning a speed or a characteristic variable which makes it possible to unambiguously determine a speed. In this case, a speed is, in the conventional sense, a speed relative to an observer fixed with respect to the route traveled by the rail vehicle. The speed characteristic variable may be a vector or a number based on a vector, for example a vector magnitude or a particular vector component.

An "inertial speed characteristic variable" is intended to be understood as meaning, in particular, a speed characteristic variable which is provided for further evaluation as the result of the inertial calculation carried out by the computing unit. It is a characteristic variable for the local speed of the inertial measuring unit or of a basic body to which the inertial measuring unit is connected. If the inertial measuring unit is rigidly connected to a basic body of the chassis unit, the inertial speed characteristic variable is a local chassis speed characteristic variable which is based on the chassis unit and can be influenced by the chassis unit's own dynamics. In particular, the inertial speed characteristic variable may be a characteristic variable for the speed at the center of gravity of the chassis unit. If movements of the chassis unit relative to a carriage body of the rail vehicle are possible, the inertial speed characteristic variable may be different in this case from the travel speed based on the entire rail vehicle. If the chassis unit is in the form of a bogie, the inertial speed characteristic variable may be a bogie speed characteristic variable in this case. If the inertial measuring unit is rigidly connected to a carriage body of the rail vehicle, it may be a characteristic variable for the speed at the center of gravity of the carriage body.

An "inertial calculation" is intended to be understood as meaning a calculation which is used to determine at least one speed variable on the basis of inertial measurement variables recorded by the inertial measuring unit, in particular by means of numerical integration. Algorithms are known for this purpose, in particular a so-called "strapdown algorithm" which can be used in combination with sensors of the inertial measuring unit which are fixed to the vehicle. The performance of an inertial calculation is sufficiently well known in the specialist literature, in particular in "Integrierte Navigationssysteme [Integrated navigation systems]", Jan Wendel, Oldenburg Wissenschaftsverlag, Munich 2007, ISBN 978-3-486-58160-7, and is not explained in any more detail here.

In the first operating mode, the inertial calculation is carried out at least on the basis of the inertial measurement variables and the reference speed characteristic variable. The consideration of the reference speed characteristic variable is used to estimate a deviation in the inertial calculation, the estimation being taken into account for the purpose of determining the inertial speed characteristic variable by feeding it back into the inertial calculation. This deviation may be, in particular, a systematic deviation, which may be produced, for example, on account of a systematic error in the recording of the inertial measurement variables by the inertial measuring unit, or a statistical deviation. A "deviation" can be understood as meaning a deviation of an individual characteristic variable or a plurality of characteristic variables.

The inertial calculation according to the second operating mode can be carried out without taking into account the reference speed characteristic variable by virtue of the fact that the formation of the reference speed characteristic variable and/or the provision of the chassis speed measurement variable is/are adjusted and/or the computing unit is decoupled from the reference speed characteristic variable or from a line transmitting the reference speed characteristic variable.

One preferred embodiment of the invention proposes that a first computing component of the computing unit determines an estimated value of the inertial speed characteristic variable from the inertial measurement variables, which estimated value is linked—in the first operating mode—to the reference speed characteristic variable for the purpose of estimating the deviation by means of a second computing component of the computing unit which forms a state observer, the deviation estimated by the second computing component being used by the first computing component. A "state observer" is intended to be understood as meaning a computing system which provides an estimation of the state of a dynamic system on the basis of an output variable of this dynamic system and on the basis of measured values for this output variable. When a state observer is applied to the present case of an inertial calculation, the "dynamic system" corresponds to the error dynamics of the inertial calculation carried out by the first computing component and the "state" corresponds to the deviation to be estimated, the estimated value of the inertial speed characteristic variable corresponding to the "output variable" and the deviation being estimated on the basis of this output variable and the reference speed characteristic variable used as the "measured value".

The following applies, for example, to a possible implementation of the state observer $$x^+_{k+1} = x^-_{k+1} + K_k(z_k - Hx^-_{k+1})$$

where $$x^-_{k+1} = \Phi x^+_k$$

and $x^+$ is the "state", that is to say the deviation to be estimated, $\Phi$ is a modeling of the "dynamic system", that is to say the error dynamics of the inertial calculation, z is the "measured" difference between the estimated value of the inertial speed characteristic variable and the reference speed characteristic variable, and H is a modeling of the influence of the measurement process on the estimated state $x^-$ during the measurement z. K is a weighting matrix (also called observer gain or "gain matrix") which takes into account, in particular, errors during the measurement z. The indices k, k+1 denote the times $t_k$, $t_{k+1}$.

Possible algorithmic implementations for the state observer are, for example, a Luenberger observer or a Kalman filter (also called "error state Kalman filter" in this application).

The first operating mode and the second operating mode for carrying out the inertial calculation by means of the computing unit differ from one another by taking into account the reference speed characteristic variable which is formed on the basis of the chassis speed measurement variable. Different embodiments of the first operating mode are possible and depend on the way in which the reference speed characteristic variable is formed. According to a first embodiment of the first operating mode which is easy to implement, the reference speed characteristic variable dynamically corresponds to the chassis speed measurement variable. This is intended to be understood as meaning that the reference speed characteristic variable is identical to the chassis speed measurement variable or that it is provided on the basis of the chassis speed measurement variable and on the basis of one or more factors which are independent of the chassis unit or rail vehicle dynamics. This includes the situation in which the chassis speed measurement variable is multiplied by a constant factor in order to form the reference speed characteristic variable. No further dynamic characteristic variable is then expediently used as the chassis speed measurement variable for forming the reference speed characteristic variable. In the second operating mode in which the reference speed characteristic variable is not taken into account by the computing unit, the state observer is expediently operated in a free propagation mode. In the possible implementation of the state observer explained above, the observer gain K is set to the value 0 for this purpose.

According to a second embodiment of the first operating mode, a global speed characteristic variable is provided and the reference speed characteristic variable is formed on the basis of the chassis speed measurement variable and the global speed characteristic variable, as a result of which the deviation can be estimated in a particularly precise manner. A "global speed characteristic variable" is intended to be understood as meaning a speed characteristic variable which is based on the dynamics of the entire rail vehicle. The global speed characteristic variable differs from the inertial speed characteristic variable which may possibly relate to the chassis unit's own dynamics.

If the rail vehicle has a vehicle bus which can be used to transmit data throughout the vehicle, the global speed characteristic variable can be provided by means of the vehicle bus or it can be provided on the basis of characteristic variables provided by means of the vehicle bus.

In the second operating mode in which the reference speed characteristic variable is not taken into account by the computing unit, the estimated value of the inertial speed characteristic variable determined by the first computing component is linked—in this embodiment of the first operating mode—to the global speed characteristic variable by means of the second computing component in order to estimate the deviation, the deviation estimated by the second computing component being used by the first computing component or the state observer being operated in a free propagation mode. In the first-mentioned alternative, an estimation of the deviation can also be taken into account in the inertial calculation, when an abnormal process of providing the chassis speed measurement variable has been detected and consideration of the reference speed characteristic variable formed from the latter is therefore intended to be avoided, by virtue of the global speed characteristic variable replacing the reference speed characteristic variable during the transition from the first operating mode to the second operating mode. The second-mentioned alternative can preferably be used when the global speed characteristic variable cannot be provided or has errors.

Different embodiments of the global speed characteristic variable are possible. According to a first type of formation which is suitable for implementing the rail vehicle with a plurality of chassis units, the global speed characteristic variable is provided at least on the basis of a speed characteristic variable of at least one chassis unit different from the first chassis unit. In particular, the global speed characteristic variable can be provided at least on the basis of an averaging of speed characteristic variables of a plurality of chassis units each different from the first chassis unit. The respective variance of the corresponding speed characteristic variables can be taken into account in this case. The speed characteristic variables of the further chassis units may each be provided as an inertial speed characteristic variable by means of the method described above for the first chassis unit.

Alternatively, the global speed characteristic variable can be provided by means of a global recording apparatus of the rail vehicle which is different from the inertial measuring unit. A "global recording apparatus" is intended to be understood as meaning a recording apparatus which is independent of, in particular different from, a local recording apparatus based on a chassis unit. In particular, the global recording apparatus may be present once in the rail vehicle. This recording apparatus can be formed, in particular, by a locating apparatus which is used to determine a position characteristic variable of the rail vehicle. For example, the position characteristic variable can be determined by recording radio signals which are radiated by track-side fixed devices, for example track balises or mobile radio antennas, or by satellites.

In the considered second embodiment of the first operating mode, in one preferred embodiment of the invention, the global speed characteristic variable is linked to the chassis speed measurement variable by means of a computing component based on the principle of sensor data merging in order to provide the reference speed characteristic variable. This makes it possible to reduce an influence of errors involved in the provision of the chassis speed measurement variable by linking the latter to the global speed characteristic variable. Various algorithms, in particular a Kalman filter, are possible for implementing sensor data merging.

Another advantageous embodiment of the invention proposes that a plurality of computing units are assigned to the first chassis unit, each computing unit being able to respectively carry out the inertial calculation according to the operating modes and providing a result of the inertial calculation at an output, and a switching apparatus is assigned to the computing units, which switching apparatus is selectively connected to one of the outputs in order to provide the inertial speed characteristic variable. This enables selective provision of the inertial speed characteristic variable which is matched to the operating modes currently used by the computing units. For example, the switching apparatus can be controlled in such a manner that it establishes a connection to a computing unit output only when the corresponding computing unit is operated in the second operating mode. This advantageously makes it possible to further reduce the influence of errors involved in the provision of the chassis speed measurement variable.

This influence can be reduced in a particularly efficient manner by virtue of the fact that a switching unit is respectively connected upstream of each computing unit and, in a first switching state, provides the reference speed characteristic variable for the respective computing unit for carrying out the first operating mode and, in a second switching state, decouples the computing unit from the reference speed characteristic variable in order to carry the second operating mode, in which case, if an abnormal recording process is not present, switching cycles of the switching units and a switching cycle of the switching apparatus are matched to one another in such a manner that the switching apparatus, during each switching process, establishes a connection to a computing unit which carries out the inertial calculation according to the second operating mode, and, if an abnormal recording process is present, all switching units are switched in the second switching state. This makes it possible to determine the inertial speed characteristic variable in a particularly reliable manner in view of an abnormal process of providing the chassis speed measurement variable since the result of a determination of the inertial speed characteristic variable which incorporates the chassis speed measurement variable cannot be directly provided as an output variable. The switching cycles can therefore be used to prevent errors in the provision of the chassis speed measurement variable from being able to directly influence the provision of the inertial speed characteristic variable. If the inertial speed characteristic variable is used as the reference characteristic variable for detecting an abnormal process of providing the chassis speed measurement variable, this detection process itself can be carried out in a particularly reliable manner. A disadvantageous influence of an abnormal provision process can therefore be avoided in many respects.

In this context, one preferred embodiment proposes that the switching units provide, in their second switching state, the global speed characteristic variable for the respective computing unit for carrying out the second operating mode.

In addition, the influence of an abnormal process of providing the chassis speed measurement variable can be reduced further by virtue of the fact that, if an abnormal recording process is not present, the switching cycles of the switching units and the switching cycle of the switching apparatus are matched to one another in such a manner that the switching apparatus, during each switching process, establishes a connection to one of the computing units which has been carrying out the inertial calculation according to the second operating mode at least for a predetermined time.

If the rail vehicle has a global recording apparatus which is different from the inertial measuring unit and provides the global speed characteristic variable for the second embodiment of the first operating mode, it is proposed that—in a wheel diameter determination mode—the inertial calculation is carried out according to the second operating mode for the purpose of determining the inertial speed characteristic variable, and at least one wheel diameter characteristic variable of the chassis unit is determined at least on the basis of the inertial speed characteristic variable determined. In this case, the second operating mode is carried out in a manner corresponding to the second embodiment of the first operating mode in which the global speed characteristic variable is taken into account in the inertial calculation by virtue of the estimated value being linked to the global speed characteristic variable by means of the second computing component in order to estimate the deviation, the deviation estimated by the second computing component being used by the first computing component. This makes it possible to determine the inertial speed characteristic variable, on the one hand, without taking into account the chassis speed measurement variable and—since the global speed characteristic variable is provided by means of the global recording apparatus—in a manner independent of recording carried out at a chassis unit, on the other hand. This enables a determination of the inertial speed characteristic variable which is independent of wheel sizes of the chassis unit, with the result that it can be used to determine the wheel diameter characteristic variable. In order to determine the wheel diameter characteristic variable, at least one measurement variable recorded by the sensor unit is expediently used in addition to the inertial speed characteristic variable. If at least one sensor of the sensor unit is in the form of a rotational speed sensor, the wheel diameter characteristic variable can be determined in a particularly simple manner on the basis of a recorded rotational speed and the inertial speed characteristic variable.

The determination of the wheel diameter characteristic variable can be advantageously used to increase the accuracy with which the inertial speed characteristic variable is determined by virtue of the fact that, during performance of the inertial calculation according to the first operating mode after the wheel diameter determination mode, the wheel diameter characteristic variable determined in the wheel diameter determination mode is included in the provision of the chassis speed measurement variable.

BRIEF DESCRIPTION OF THE SEVERAL VIEWS OF THE DRAWING

Exemplary embodiments of the invention are explained using the drawings, in which.

DESCRIPTION OF THE INVENTION

Figure 1:
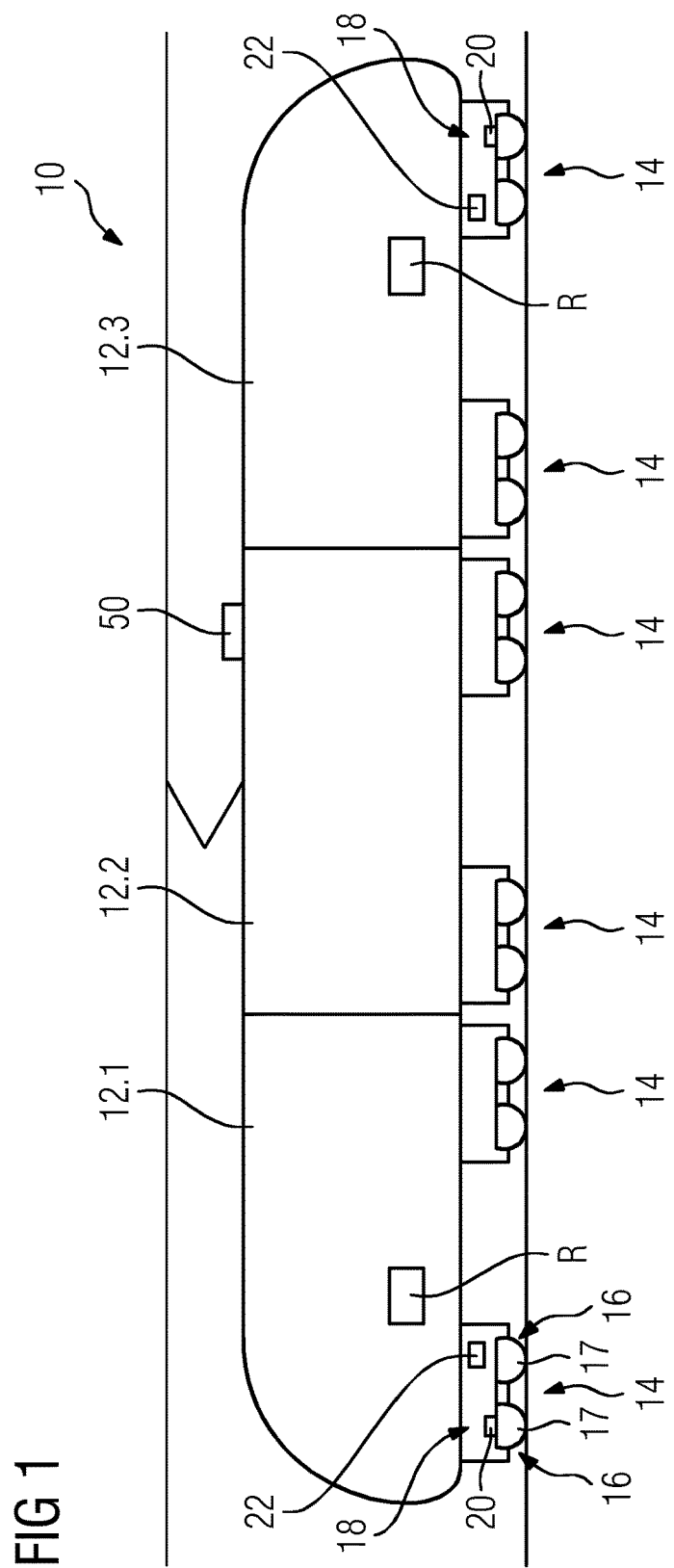
FIG. 1: shows a side view of an electrical multiple unit with chassis units.

FIG. 1 shows a schematic side view of a rail vehicle 10 in the form of an electrical multiple unit. Said rail vehicle has a plurality of carriages 12.1 to 12.3 which are each supported on rails by means of two chassis units 14. The chassis units 14 are each in the form of a bogie which is used to mount two wheelsets 16 which are in contact with the rails. In this case, a wheelset 16 has two wheels 17 in each case.

Figure 2:
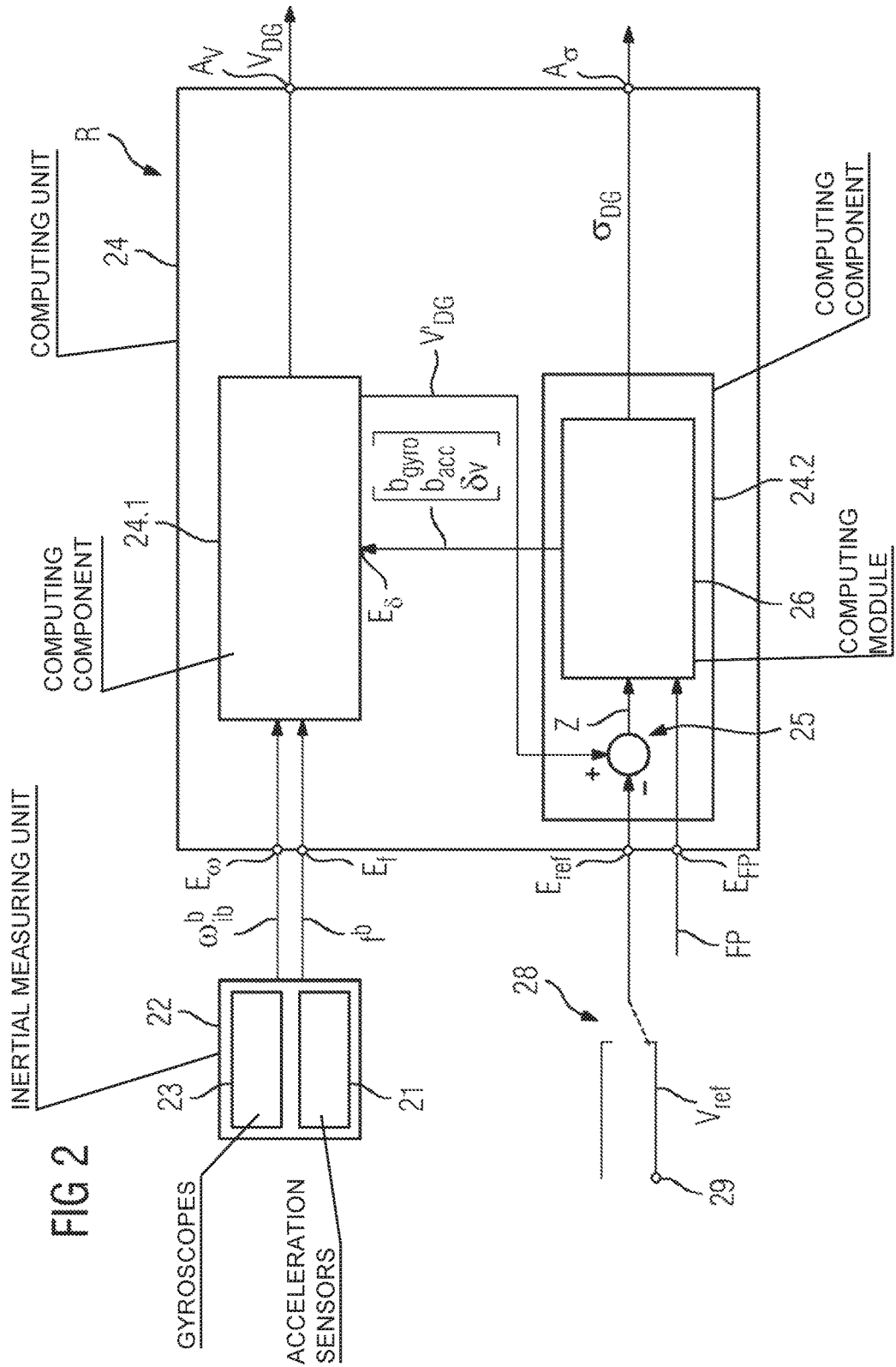
FIG. 2: shows an inertial measuring unit coupled to a chassis unit and a computing apparatus for carrying out an inertial calculation.

A plurality of, in particular two, chassis units 14 each comprise a sensor unit 18 which is used to record at least one measurement variable n. In the embodiment considered, the sensor unit 18 has a rotational speed sensor 20 which is assigned to a wheelset 16 of the chassis unit 14, the measurement variable n corresponding to the rotational speed of this wheelset 16. These chassis units 14 are each equipped with at least one drive motor (not shown) which is used as an electrodynamic brake in a process of braking the rail vehicle 10 and can be controlled accordingly by means of a control system. In addition, an inertial measuring unit 22 is assigned to each of these chassis units 14 of the rail vehicle 10, which inertial measuring unit is mechanically rigidly coupled to the corresponding chassis unit 14. In this case, the inertial measuring unit 22 is mechanically rigidly coupled to a basic body of the corresponding chassis unit 14, for example to the frame thereof in the considered embodiment of the chassis unit 14 as a bogie. The inertial measuring unit 22 comprises acceleration sensors 21, which are illustrated in FIG. 2 and output three translational inertial measurement variables $f^b_x$, $f^b_y$ and $f^b_z$, and three gyroscopes 23 which output three rotational inertial measurement variables $\omega^b_{ib,x}$, $\omega^b_{ib,y}$ and $\omega^b_{ib,z}$. The recording is carried out in a reference system of the inertial measuring unit 22 which is fixed with the chassis unit 14 and is also called "b frame". This reference system is defined by three axes x, y, z, the x axis pointing in the direction of the vehicle longitudinal axis if the rail vehicle 10 is oriented in a straight manner, the y axis being oriented parallel to the track plane and perpendicular to the x axis, the z axis being perpendicular to the x axis and the y axis, and the origin coinciding with the inertial measuring unit 22. The translational inertial measurement variables can be represented as an "acceleration vector" $f^b$. The rotational inertial measurement variables $\omega^b_{ib,x}$, $\omega^b_{ib,y}$ and $\omega^b_{ib,z}$ can be represented as a rate of rotation vector $\omega^b_{ib}$. The latter represents the rates of rotation measured in the "b frame" reference system for this "b frame" reference system relative to an inertial system, also called "i frame".

At least one computing apparatus R having at least one computing unit 24 is also assigned to each of these chassis units 14 (see FIG. 2) and carries out an inertial calculation at least on the basis of the inertial measurement variables $f^b$, $\omega^b_{ib}$. The inertial calculation is carried out by implementing an algorithm referred to by the term "strapdown algorithm" in the language of specialists. This algorithm is known from the specialist literature and is not explained in any more detail here. An estimated value $V'_{DG}$ of an inertial speed characteristic variable $V_{DG}$ is determined, in particular, by means of a numerical integration carried out in the inertial calculation on the basis of the inertial measurement variables $f^b$, $\omega^b_{ib}$, as explained in more detail below using FIG. 2. The inertial speed characteristic variable $V_{DG}$ is a characteristic variable for a speed which, in the conventional sense, is a speed relative to an observer fixed with respect to the route traveled by the rail vehicle 10. The inertial speed characteristic variable $V_{DG}$ or its estimated value $V'_{DG}$ results from a numerical integration for the speed V, expressed in the so-called navigation frame, also called "n frame", and possibly from a conversion of said speed in a coordinate system which has been shifted in comparison with the n frame and the origin of which coincides with a reference point, in particular the center of gravity, of the body to which the inertial measuring unit 22 is rigidly coupled (so-called "lever arm compensation"). As a result of the rigid connection between the inertial measuring unit 22 and the chassis unit 14, a characteristic variable for the chassis unit speed, in particular the speed at the center of gravity of the chassis unit 14, can be derived from the inertial speed characteristic variable $V_{DG}$. Therefore, the inertial speed characteristic variable $V_{DG}$ can be influenced by the chassis unit's 14 own local dynamics. In another embodiment (not shown), the inertial measuring unit 22 can be rigidly connected to a carriage body of the rail vehicle 10, the inertial speed characteristic variable $V_{DG}$ then being able to be a characteristic variable for the carriage body speed, in particular the speed at the center of gravity of the carriage body.

The determination of the inertial speed characteristic variable $V_{DG}$ is explained below for one of the chassis units 14 which is assigned a sensor unit 18, an inertial measuring unit 22 and a computing apparatus R. This description is used for the further chassis unit 14 of the rail vehicle 10 which has a corresponding design. In another embodiment of the rail vehicle 10, it is conceivable, if there are more than two chassis units, for a sensor unit 18, an inertial measuring unit 22 and a computing apparatus R to be provided in each case or for them to be provided only for a single chassis unit 14.

FIG. 2 shows a structural implementation of the computing unit 24. The latter has a first computing component 24.1 which determines and provides the estimated value $V'_{DG}$ of the inertial speed characteristic variable $V_{DG}$ from the output variables of the inertial measuring unit 22 which are passed to inputs $E_f$ and $E_\omega$ of the computing unit 24, that is to say the inertial measurement variables $f^b$, $\omega^b_{ib}$, by means of the strapdown algorithm.

This inertial calculation can be carried out by means of the computing unit 24 according to two operating modes.

In a first operating mode, a reference speed characteristic variable $V_{ref}$ is included during performance of the inertial calculation by the computing unit 24. This is used to estimate a deviation in the inertial calculation and to determine a corrected value of the inertial speed characteristic variable $V_{DG}$ by feeding the estimated deviation back into the inertial calculation. The provision of the reference speed characteristic variable $V_{ref}$ is described in more detail further below.

The computing unit 24 has a second computing component 24.2 which forms a state observer. In order to estimate the deviation, the estimated value $V'_{DG}$ determined by the first computing component 24.1 is linked to the reference speed characteristic variable $V_{ref}$ in the state observer. In this case, the estimated value $V'_{DG}$ is subtracted from the reference speed characteristic variable $V_{ref}$, which is passed to an input $E_{ref}$ of the computing unit 24, using a difference-forming unit 25 of the second computing component 24.2. The difference z determined in this case is passed to a computing module 26 of the second computing component 24.2 or the state observer. The computing module 26 implements an algorithm which is called an "error state Kalman filter" in the language of specialists. This filter is used for a state vector x which contains, in particular, the following characteristic variables for the production of a deviation in the inertial calculation: a characteristic variable $b_{gyro}$ relating to errors with respect to the inertial measurement variables $\omega^b_{ib}$, a characteristic variable b, relating to errors with respect to the inertial measurement variables $f^b$ and a characteristic variable $\delta v$ relating to a deviation in the inertial speed characteristic variable $V_{DG}$ determined from the inertial measurement variables $f^b$, $\omega^b_{ib}$, which deviation is produced in the inertial calculation.

On the basis of the state vector $x^+_k$ estimated at a time k, the state vector x at the time k+1 is estimated $x^-_{k+1}$ in the computing module 26 on the basis of a modeling $\Phi$ of the error dynamics of the inertial calculation:

$$x^-_{k+1} = \Phi x^+_k$$

This corresponds to a prediction equation for the state observer, which equation is used for a dynamic system without a controlled or control variable (described as input "u" in the specialist literature).

On the basis of the error $P^+_k$ estimated at the time k, the following applies to the error affecting the estimated state vector $x^-_{k+1}$ $$P^-_{k+1} = \Phi P^+_k \Phi^T + Q_k$$

with the covariance matrix $Q_k$.

The estimation $x^-_{k+1}$ of the state vector x at the time k+1 is corrected using the measurement vector $z_k$:

$$x^+_{k+1} = x^-_{k+1} + K_k(z_k - H\, x^-_{k+1})$$

where H is the observation matrix and the following applies to the weighting matrix $K_k$ (also called "Kalman gain matrix" or observer gain):

$$K_k = P^-_{k+1} H^T (H\, P^-_{k+1} H^T + R_k)^{-1}$$

In this case, $R_k$ is a matrix which represents the error affecting the measurement vector $z_k$.

An error affecting the reference speed characteristic variable $V_{ref}$ contributes to this error, in particular.

The following applies to the error affecting the estimated state vector $x^+_{k+1}$ $$P^+_{k+1} = (1 - K_k H) P^-_{k+1}$$

The above-mentioned characteristic variables $b_{gyro}$, $b_{acc}$ and $\delta v$ of the estimated state vector $x^+_{k+1}$ are passed to an input $E_\delta$ of the first computing component 24.1. The estimated deviation ($b_{gyro}$, $b_{acc}$, $\delta v$) is fed back into the inertial calculation therewith.

These characteristic variables are taken into account by the first computing component 24.1 when carrying out the inertial calculation, as a result of which a deviation $\delta V_{DG}$ of the inertial speed characteristic variable $V_{DG}$ can be determined. After this deviation $\delta V_{DG}$ has been subtracted from the estimated value $V'_{DG}$ in the computing component 24.1, the inertial speed characteristic variable $V_{DG}$ corrected therewith is provided at an output $A_v$ of the computing unit 24. As a further output variable of the computing unit 24, the variance $\sigma_{DG}$ assigned to the inertial speed characteristic variable $V_{DG}$ is determined from the error and and is provided at an output $A_\sigma$ of the computing unit 24.

The inertial calculation can be carried out using a second operating mode. The latter is characterized in that the reference speed characteristic variable $V_{ref}$ is not taken into account when performing the inertial calculation.

In order to change between the operating modes described above, a switching unit 28 is connected upstream of the computing unit 24, in particular the state observer 26 which uses the reference speed characteristic variable $V_{ref}$ in the first operating mode. Said switching unit has a first switching state in which the switching unit 28 provides the reference speed characteristic variable $V_{ref}$ for the computing unit 24 for carrying out the first operating mode. In a second switching state, the computing unit 24 is decoupled from the reference speed characteristic variable $V_{ref}$ or a line transmitting this reference speed characteristic variable $V_{ref}$ in order to carry out the second operating mode.

A description is now given of two exemplary embodiments which differ from one another in terms of the embodiment of the reference speed characteristic variable $V_{ref}$ and the performance of the inertial calculation in the second operating mode.

Figure 3:
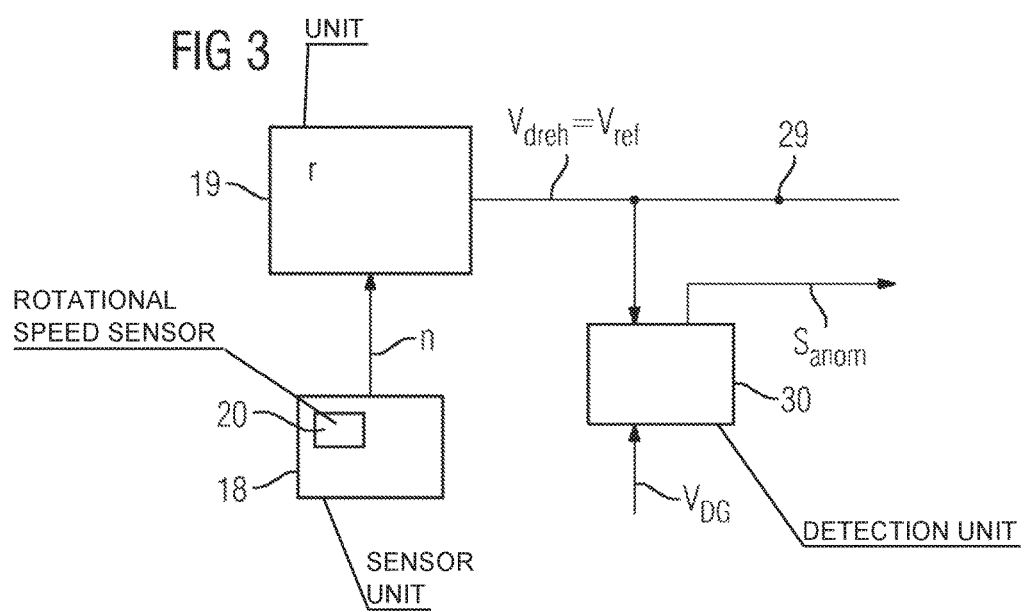
FIG. 3: shows the provision of a reference speed characteristic variable for the inertial calculation according to a first embodiment.

The provision of the reference speed $V_{ref}$ according to a first exemplary embodiment is explained using FIG. 3.

Said figure shows the sensor unit 18 which records the measurement variable n. A chassis speed measurement variable $V_{dreh}$ based on the respective chassis unit 14 is provided therefrom. For example, the chassis speed measurement variable $V_{dreh}$ can be provided from the measurement variable n in the form of a rotational speed in a unit 19 as the circumferential speed of the corresponding wheelset 16 by taking into account a wheel diameter characteristic variable r.

In the first exemplary embodiment considered, the chassis speed measurement variable $V_{dreh}$ represents the reference speed characteristic variable $V_{ref}$ used by the computing unit 24 in the first operating mode.

The provision of the chassis speed measurement variable $V_{dreh}$, in particular the recording of the measurement variable n on which the latter is based, is monitored. A further reference characteristic variable is used for this monitoring and is compared with the chassis speed measurement variable $V_{dreh}$ in a detection unit 30. In this case, the reference characteristic variable corresponds to the inertial speed characteristic variable $V_{DG}$ determined by the computing unit 24. If the difference $AbS(V_{dreh} - V_{DG})$ formed in the detection unit 30 exceeds a preset threshold value, the process of providing the chassis speed measurement variable $V_{dreh}$ is considered to be "abnormal". This situation may occur, for example, in the case of a defect in the sensor unit 18 or slipping of the respective chassis unit 14.

With the detection of an abnormal provision process by the detection unit 30, the latter generates a signal $S_{anom}$ which causes a change from the first operating mode to the second operating mode. In this case, the switching unit 28 is actuated, in particular, and decouples the computing unit 24, in particular the state observer 26, from the reference speed characteristic variable $V_{ref}$. In addition, a signal FP is generated and is passed to an input $E_{FP}$ of the computing unit 24 (see FIG. 2). If an active signal FP is present at this input $E_{FP}$, the second computing component 24.2 is operated in a free propagation mode. In this case, the observer gain K is set to the value 0. As a result, only the system state x and the error P are propagated without updating by means of the measurement vector z.

Figure 4:
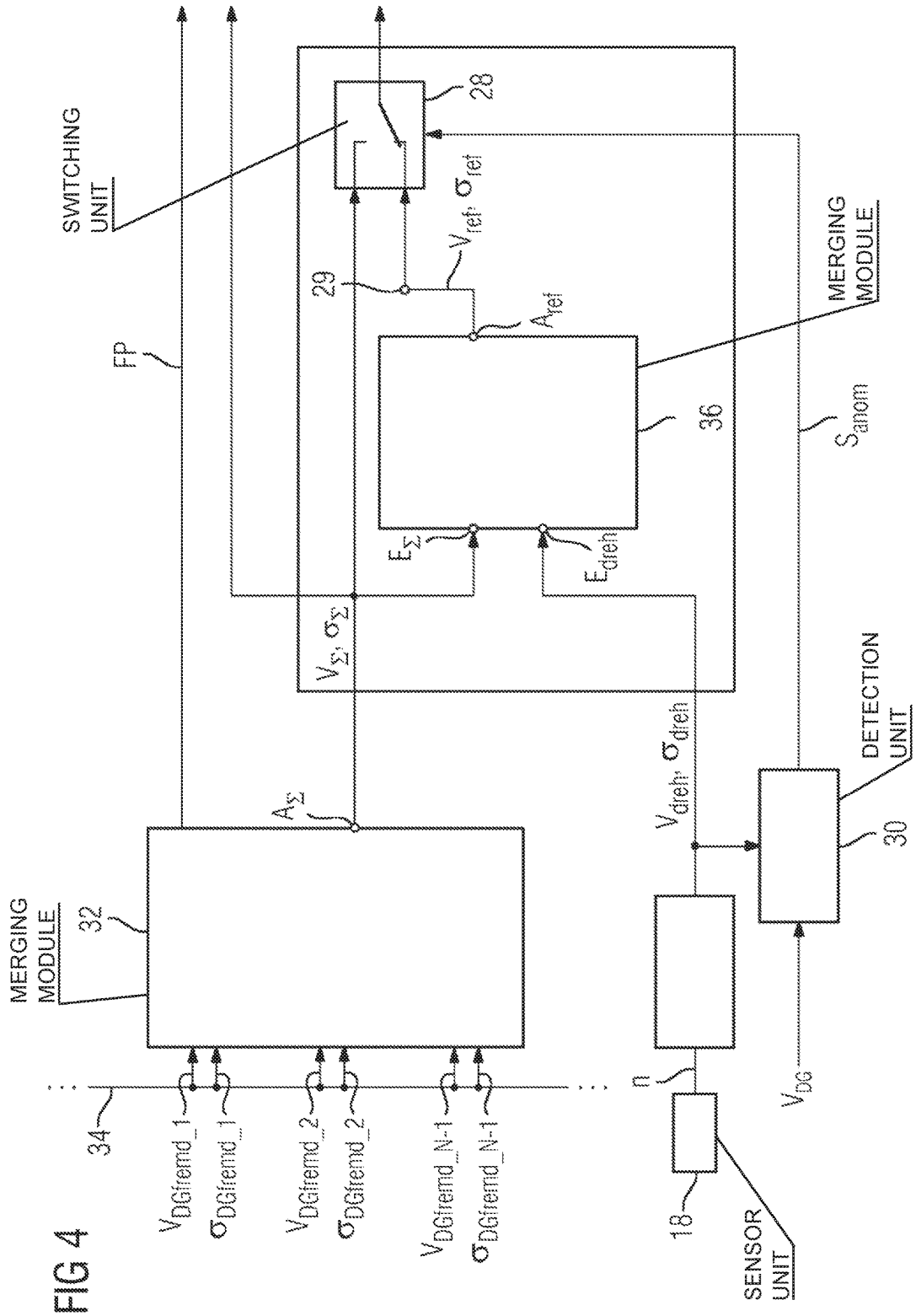
FIG. 4: shows the provision of a reference speed characteristic variable for the inertial calculation according to a second embodiment.

The provision of the reference speed $V_{ref}$ according to a second exemplary embodiment is now explained using FIG. 4.

In this exemplary embodiment, a global speed characteristic variable $V_\Sigma$ is provided. This provision which is carried out in a merging module 32 is carried out on the basis of at least one speed characteristic variable $V_{DGfremd\_i}$ which is based on a further chassis unit 14 of the rail vehicle 10. If a plurality of speed characteristic variables $V_{DGfremd\_i}$ are used, they are each based on a different chassis unit 14. Assuming that the above description is directed to the determination of the inertial speed characteristic variable $V_{DG}$ for the chassis unit 14.N, where N corresponds to the number of chassis units 14 in the rail vehicle 10, the global speed characteristic variable $V_\Sigma$ can be determined on the basis of speed characteristic variables $V_{DGfremd\_1}$ to $V_{DGfremd\_N-1}$, as illustrated in the figure, if a speed characteristic variable is available for each of the chassis units 14.1 to 14.N-1. However, an embodiment is conceivable in which fewer speed characteristic variables $V_{DGfremd\_i}$ are available.

The speed characteristic variables $V_{DGfremd\_i}$ used can be determined using the method described above for the inertial speed characteristic variable $V_{DG}$ and therefore may each be in the form of an inertial speed characteristic variable $V_{DG\_i}$ of the associated chassis unit 14.i. The merging module 32 is connected to a vehicle data bus 34, in particular the so-called "MVB" (or "multifunction vehicle bus"), from which the speed characteristic variables $V_{DGfremd\_i}$ can be read by the merging module 32.

In the embodiment considered, the global speed characteristic variable $V_\Sigma$ is the result of merging and checking the plausibility of the individual speed characteristic variables $V_{DGfremd\_i}$ used, which are carried out by the merging module 32. This is carried out taking into account the variances $\sigma_{DGfremd\_i}$ which are each assigned to the corresponding speed characteristic variable $V_{DGfremd\_i}$ and are likewise provided via the vehicle data bus 34. The variances $\sigma_{DGfremd\_i}$ may each be determined by a state observer, as described above. The merging and plausibility checking of the individual speed characteristic variables $V_{DGfremd\_i}$ correspond, in particular, to an averaging of the speed characteristic variables $V_{DGfremd\_i}$ which is weighted using the variances $\sigma_{DGfremd\_i}$. If a speed characteristic variable $V_{DGfremd\_i}$ is not available, the corresponding variance can be set to the value infinite in the evaluation algorithm.

The global speed characteristic variable $V_\Sigma$ and its variance $\sigma_\Sigma$ are provided at an output $A_\Sigma$ of the merging module 32 as results of the merging and plausibility checking of the individual speed characteristic variables $V_{DGfremd\_i}$.

The reference speed characteristic variable $V_{ref}$ which is used by the computing unit 24 when carrying out the inertial calculation in the first operating mode is provided on the basis of the chassis speed measurement variable $V_{dreh}$ and the global speed characteristic variable V. This is carried out using a merging module 36 which belongs to the computing apparatus R and, in order to provide the reference speed characteristic variable $V_{ref}$, links the global speed characteristic variable $V_\Sigma$ to the chassis speed measurement variable $V_{dreh}$ on the basis of the principle of sensor data merging. In the exemplary embodiment considered, the merging module 36 is equipped with an implementation of a Kalman filter. As input variables, the global speed characteristic variable $V_\Sigma$ and the associated variance $\sigma$ are passed to an input $E_\Sigma$ of the merging module 36 and the chassis speed measurement variable $V_{dreh}$ and the associated variance $\sigma_{dreh}$ are passed to an input $E_{dreh}$ of the merging module 36.

The provision of the chassis speed measurement variable $V_{dreh}$ and the detection unit 30 are likewise illustrated, in which case reference is made to the above description with respect to FIG. 3.

The Kalman filter is used for a state vector x which represents the merged reference speed $V_{ref}$. On the basis of a value for the state vector x at a time k, the state vector x is estimated at the time k+1 on the basis of a modeling $\Phi$ of the dynamics of the chassis unit 14 and of the rail vehicle 10:

$$x^-_{k+1} = \Phi x^+_k$$

In particular, the matrix $\Phi$ can describe a dynamic model in which a constant acceleration is assumed.

The following applies to the estimation error:

$$P^-_{k+1} = \Phi P^+_k \Phi^T$$

The estimation is corrected using the measurement vector $z_k$ which combines the chassis speed measurement variable $V_{dreh}$ and the global speed characteristic variable $V_\Sigma$:

$$x^+_{k+1} = x^-_{k+1} + K_k(z_k - H\, x^-_{k+1})$$

with $z_k = (V_\Sigma, V_{dreh})$, where H is the observation matrix and the following applies to the weighting matrix $K_K$ (also called "Kalman gain matrix"):

$$K_k = P^-_{k+1} H^T (H\, P^-_{k+1} H^T + R_k)^{-1}$$

In this case, $R_k$ is a matrix containing the measurement errors $\sigma_{dreh}$, $\sigma_\Sigma$.

The following applies to the error affecting the estimated state vector $x^+_{k+1}$ $$P^+_k = (1 - K_k H) P^-_{k+1}$$

The value of the reference speed characteristic variable $V_{ref}$ updated using the algorithm and its variance $\sigma_{ref}$ determined from the error P are provided at an output $A_{ref}$ of the merging module 36.

In the first operating mode, the inertial calculation is carried out as already explained above by virtue of the switching unit 28 providing the reference speed characteristic variable $V_{ref}$ for the computing unit 24.

As explained using FIG. 3, the process of recording the measurement variable n on which the chassis speed measurement variable $V_{dreh}$ is based is monitored. A change to the second operating mode as a result of the detection of an abnormal process of providing the chassis speed measurement variable $V_{dreh}$ is carried out as described above for the first exemplary embodiment. In this case, the detection unit 30 generates the signal $S_{anom}$ which is used to actuate the switching unit 28 in order to switch to the second switching state.

The performance of the inertial calculation according to the second operating mode differs from the first exemplary embodiment described above (in which the state observer or second computing component 24.2 is operated in a free propagation mode) in that the switching unit 28 decouples the computing unit 24 from the reference speed characteristic variable $V_{ref}$ and provides the global speed characteristic variable $V_\Sigma$ instead of the latter for the computing unit 24. Therefore, the global speed characteristic variable $V_\Sigma$ is used instead of the reference speed characteristic variable $V_{ref}$ by the state observer or second computing component 24.2 and is linked to the estimated value $V'_{DG}$ of the inertial speed characteristic variable $V_{DG}$ in order to determine the characteristic variables $b_{gyro}$, $b_{acc}$ and $\delta v$.

If the global speed characteristic variable $V_\Sigma$ is not available for carrying out the inertial calculation according to the second operating mode, the merging module 32 generates the signal FP which is passed to the input $E_{FP}$ of the second computing component 24.2, and the state observer is operated in the free propagation mode.

Figure 5:
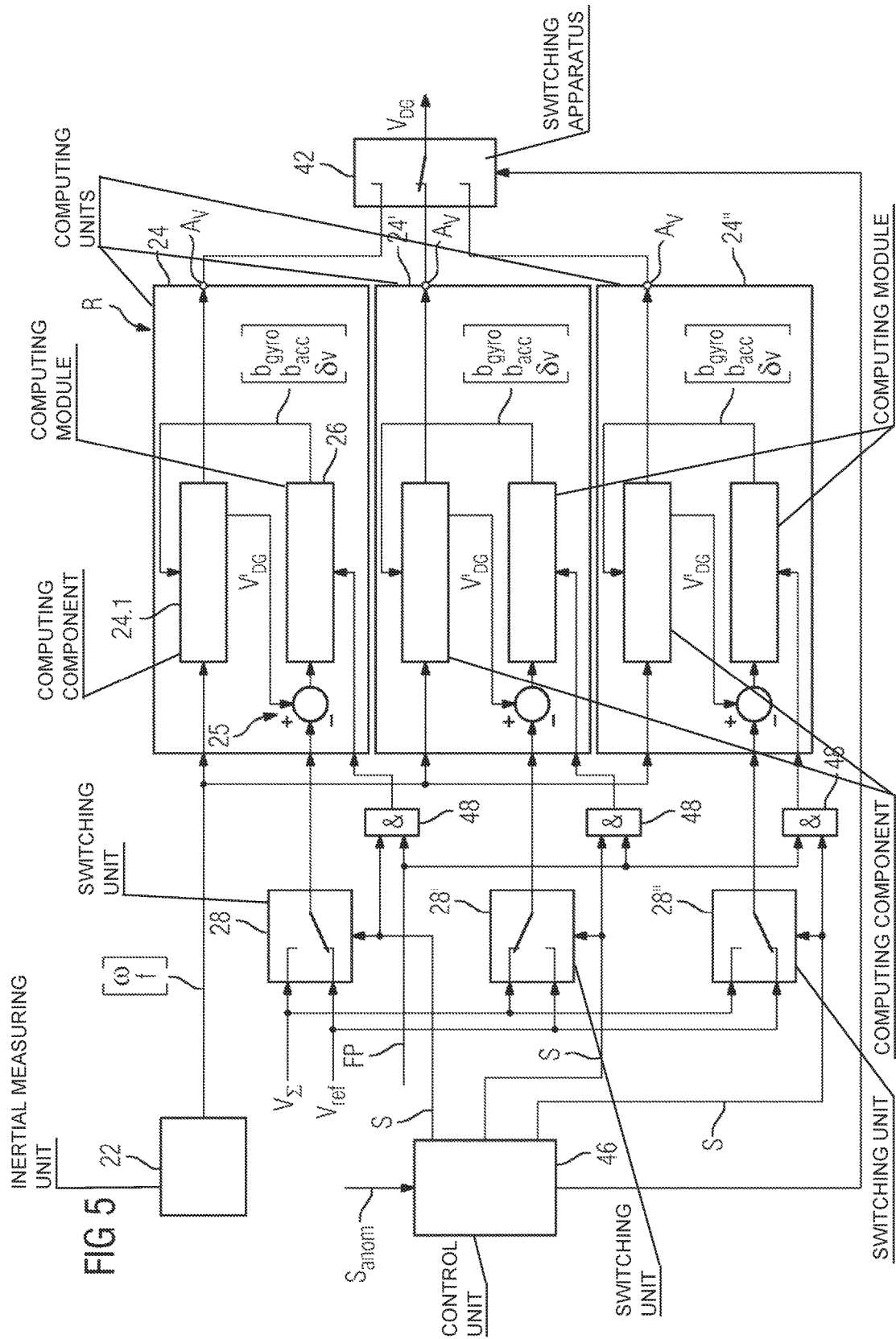
FIG. 5: shows an alternative embodiment of the computing apparatus having a plurality of computing units for carrying out the inertial calculation and switching units for switching between two operating modes of the computing units.

The above description is directed to the embodiment of the computing apparatus R with one computing unit 24. A further embodiment in which the computing apparatus R has a plurality of computing units 24, 24' and 24" for providing the inertial speed characteristic variable $V_{DG}$ is described below. This embodiment is shown in FIG. 5. The further computing units 24' and 24" are likewise provided for the purpose of carrying out the inertial calculation on the basis of the same inertial measurement variables $\omega^b_{ib}$ and $f^b$ as for the computing unit 24 according to the operating modes described above. As described above, each computing unit 24, 24', 24" provides a result of the inertial calculation at its output $A_v$. A downstream switching apparatus 42 is assigned to the computing units 24, 24', 24" and is optionally connected to one of the outputs $A_v$ for the purpose of providing the inertial speed characteristic variable $V_{DG}$.

A switching unit 28, 28' and 28" is respectively connected upstream of each computing unit 24, 24', 24" and its function has already been described further above: in a first switching state, the switching unit 28, 28' and 28" provides the reference speed characteristic variable $V_{ref}$ for the respective computing unit 24, 24' and 24" if the latter carries out the inertial calculation according to the first operating mode. In a second switching state, the associated computing unit 24, 24', 24" is decoupled from the reference speed characteristic variable $V_{ref}$ in order to carry out the second operating mode. According to the embodiment in FIG. 3, the free propagation mode of the associated state observer or second computing component 24.2 (not shown in FIG. 5) is initiated with the decoupling, whereas, in the embodiment according to FIG. 4, the global speed characteristic variable $V_\Sigma$ is used by the state observer instead of the reference speed characteristic variable $V_{ref}$.

If a normal process of providing the chassis speed measurement variable $V_{dreh}$ is present, the switching apparatus 42 and the switching units 28, 28', 28" are operated according to preset switching cycles which are matched to one another. These switching cycles are explained using FIG. 6.

Figure 6:
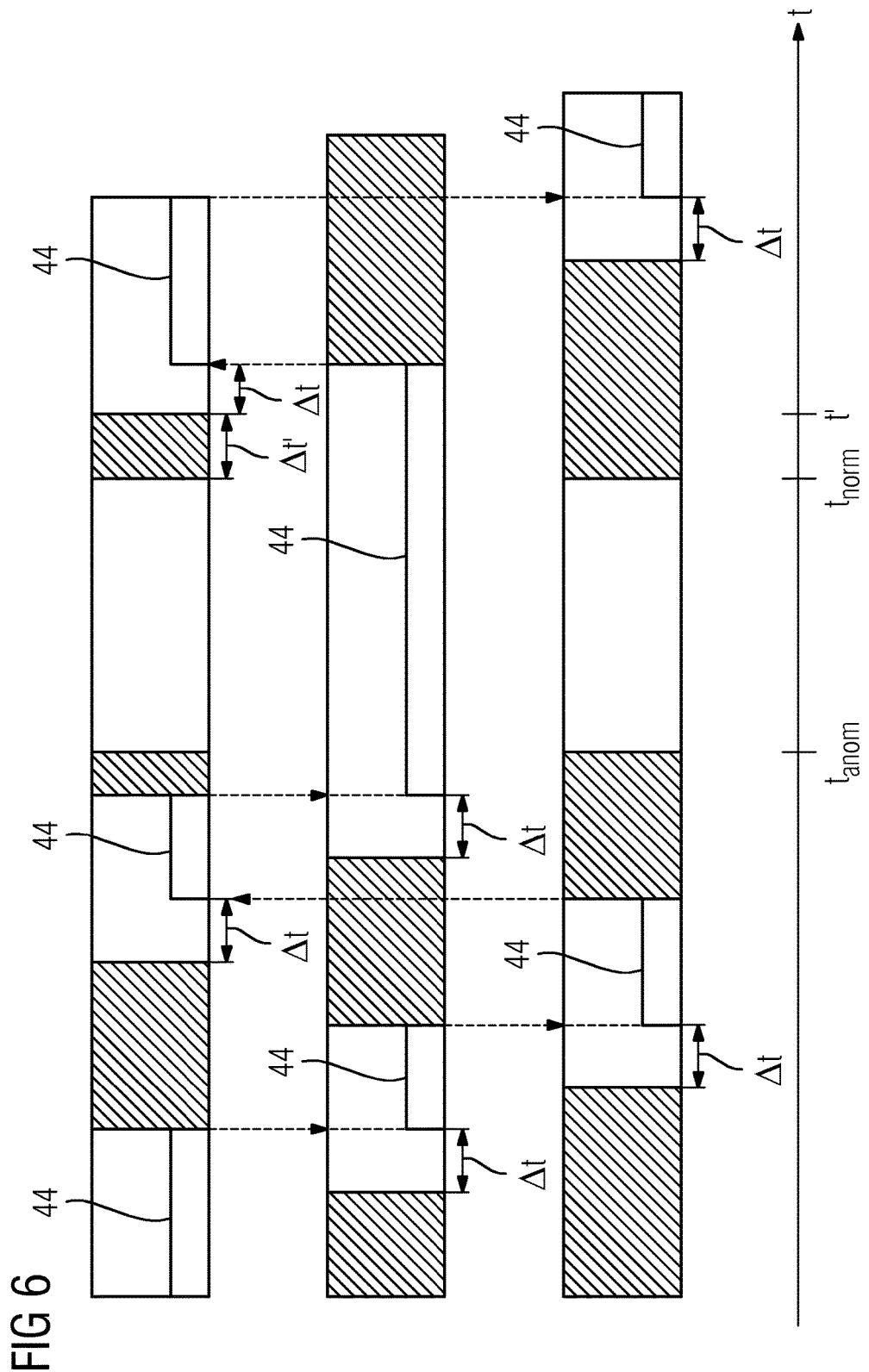
FIG. 6: shows switching cycles of the switching units.

FIG. 6 illustrates, for each computing unit 24, 24' and 24", the switching cycles of the corresponding switching unit 28, 28' and 28" by alternating hatched and non-hatched areas as a function of the time t plotted on the horizontal axis. A hatched area corresponds to a period in which the inertial calculation carried out by the associated computing unit is carried out according to the first operating mode, that is to say the reference speed characteristic variable $V_{ref}$ is taken into account by this computing unit for estimating the deviation. During a period represented by a non-hatched area, the inertial calculation is carried out according to the second operating mode, that is to say without taking into account the reference speed characteristic variable $V_{ref}$.

If a normal process of providing the chassis speed measurement variable $V_{dreh}$ is present, the switching cycles of the switching units 28, 28' and 28" are temporally offset from one another in such a manner that a switching unit can be fundamentally switched to the second switching state, that is to say the associated computing unit can be changed over to the second operating mode, if another switching unit itself is still in the second switching state. In other words, there is fundamentally a temporal overlap between the end of a period in which a switching unit is in the second switching state and the beginning of a further period in which another switching unit is in the second switching state. This is reflected by overlapping between the end of a non-hatched area for a first computing unit and the start of a non-hatched area for a second computing unit.

The switching cycle of the switching apparatus 42 connected downstream of the computing units 24, 24' and 24" is shown using a bold line 44. The successive switching processes of the switching apparatus 42 are represented by transitions of the line 44 between the different rows of the diagram. For example, the line 44 present in the first non-hatched area of the first row assigned to the computing unit 24 represents the situation in which the switching apparatus 42 establishes a connection to the output $A_v$ of this computing unit 24, that is to say the chassis speed characteristic variable $V_{DG}$ is provided by this computing unit 24. The transition of the line 44 to the second row corresponds to a changeover of the switching apparatus 42 which establishes an active connection to the output $A_v$ of the second computing unit 24'.

It can be gathered from the diagram that the switching apparatus 42, during each switching process (that is to say row transition in the diagram), establishes an active connection to a computing unit which carries out the inertial calculation according to the second operating mode. In particular, the switching cycles of the switching units 28, 28', 28" and of the switching apparatus 42 are matched to one another in such a manner that the switching apparatus 42, during each switching process, establishes an active connection to a computing unit which has been carrying out the inertial calculation according to the second operating mode for at least a predetermined time $\Delta t$. This is enabled by the above-described overlapping between the non-hatched areas.

The switching processes of the switching units 28, 28', 28" and of the switching apparatus 42 are controlled by a control unit 46 (see FIG. 5) in which the above-described switching cycles are programmed.

The above description of the switching cycles relates to the situation of a normal provision process. If an abnormal process of providing the chassis speed measurement variable $V_{dreh}$ is detected by the detection unit 30, the signal $S_{anom}$ is received by the control unit 46 which changes over switching units 28 to the second switching state or maintains the already present second switching state of switching units 28 so that all computing units 24, 24', 24" are decoupled from the reference speed characteristic variable $V_{ref}$. This is illustrated in the diagram in FIG. 6 at a time $t_{anom}$. All computing units 24, 24', 24" are then operated in the second operating mode and the switching cycle of the switching apparatus 42 is stopped.

At a time $t_{norm}$ at which ending of the abnormal provision process is detected by the detection unit 30, two of the three computing units 24, 24', 24" are operated in the first operating mode. These are the computing units to which the switching apparatus 42 was not actively connected during the period [$t_{anom}$, $t_{norm}$]. After the time $t_{norm}$, the switching apparatus 42 still remains separated from these computing units. In this case, the third computing unit to which the switching apparatus 42 remains actively connected is still operated in the second operating mode. At a time t' after expiry of a time $\Delta t'$ after the time $t_{norm}$, a change to the second operating mode is carried out for one of the computing units which is in the first operating mode. After expiry of the period $\Delta t$, the switching apparatus 42 is actively connected to this computing unit and the above-described switching operation with regular switching processes is started again.

In an embodiment of the second operating mode according to FIG. 4 in which the global speed characteristic variable $V_\Sigma$ is used instead of the reference speed characteristic variable $V_{ref}$, a measure is provided for the situation in which the global speed characteristic variable $V_\Sigma$ is not available. In this case, an AND element 48 is respectively connected upstream of each computing unit 24, 24' and 24", to which element a control signal S generated by the control unit 46 for controlling the corresponding switching unit 28, 28' and 28" and the signal FP representing the unavailability of the global speed characteristic variable $V_\Sigma$ (see FIG. 4) are applied. If the global speed characteristic variable is not available (in which case a signal FP is generated) and if the control signal S corresponds to switching of the corresponding switching unit 28, 28', 28" to the second switching state (decoupling of the reference speed characteristic variable $V_{ref}$), the computing component 24.2 of the corresponding computing unit 24, 24' and 24" is operated in a free propagation mode by virtue of a signal being triggered by the AND element 48. This corresponds to an embodiment of the second operating mode according to the embodiment in FIG. 3.

Figure 7:
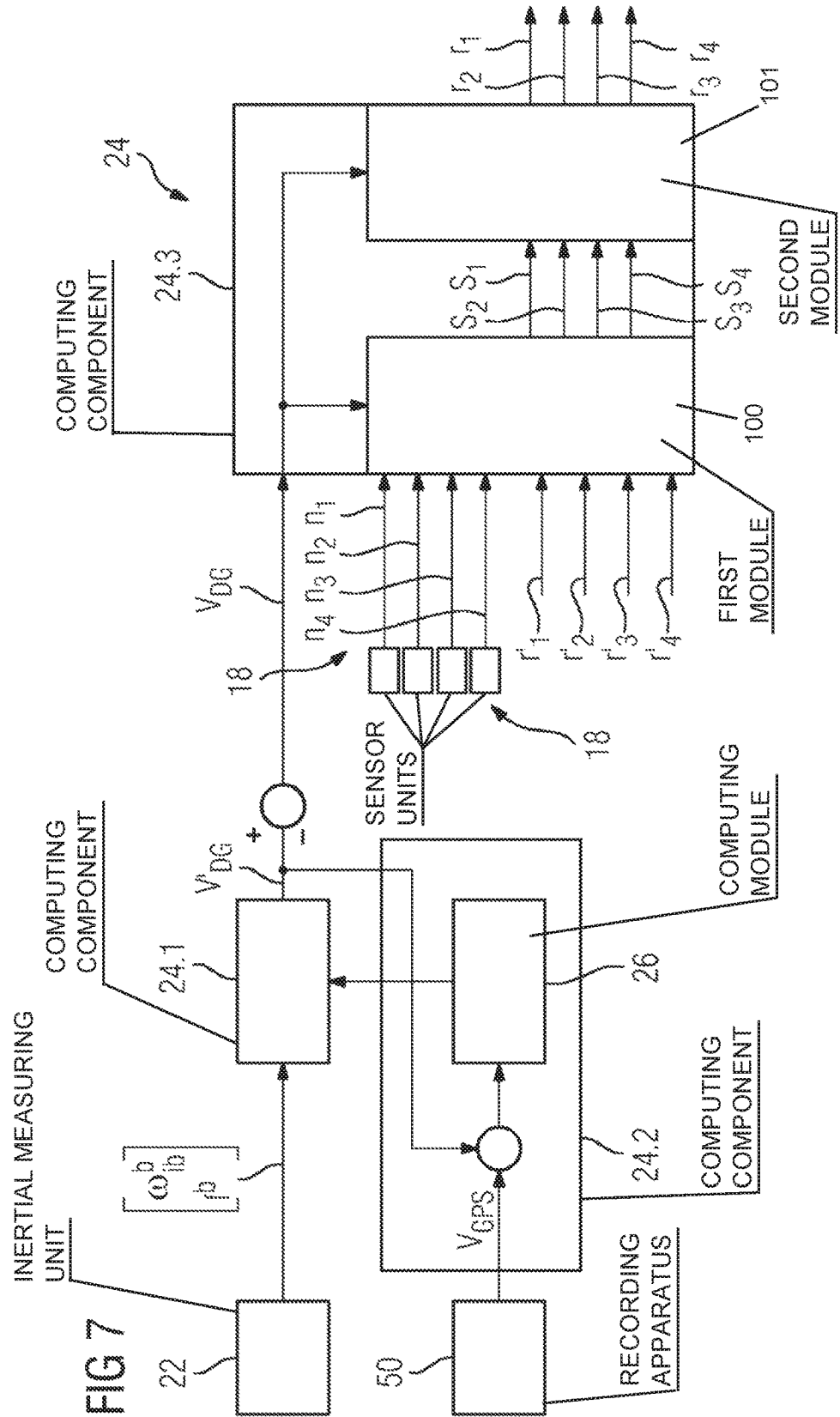
FIG. 7: shows an alternative embodiment of the computing apparatus having a module for determining the wheel diameter.

Another exemplary embodiment is now explained using FIG. 7. This exemplary embodiment differs from the exemplary embodiment in FIG. 4, in particular, by the provision of a global speed characteristic variable and the arrangement of a further computing component 24.3 of the computing unit 24 which is provided for the purpose of carrying out a wheel diameter determination mode. It is also assumed that the sensor units 18 of the chassis units 14 in FIG. 1 each have two sensors each assigned to a different wheelset 16 of the corresponding chassis unit 14. Four measurement variables $n_1$ to $n_4$ are therefore recorded by the sensor units 18. A wheel diameter characteristic variable $r_1$, $r_2$, $r_3$ and $r_4$ is determined for each of these wheelsets 16 on the basis of these measurement variables $n_1$ to $n_4$. In the embodiment considered, the measurement variables $n_1$ to $n_4$ are each in the form of a rotational speed.

A wheel diameter determination in the wheel diameter determination mode can be carried out by a computing apparatus R which is assigned to one of the inertial measuring units 22 of the rail vehicle 10. This determination is based on carrying out the inertial calculation according to the second operating mode using the computing components 24.1 and 24.2, in which case a global speed characteristic variable $V_{GPS}$ is used by the second computing component 24.2 or state observer. This global speed characteristic variable is provided by means of a recording apparatus 50 of the rail vehicle 10 (also see FIG. 1) which has a position recording apparatus, in particular. The latter is used to record a position characteristic variable for the position of the rail vehicle 10 by recording signals from a locating system, for example a satellite-based locating system. The recording apparatus 50 provides the global speed characteristic variable $V_{GPS}$ based on the entire rail vehicle 10 on the basis of recorded position characteristic variables.

The inertial speed characteristic variable $V_{DG}$ determined by means of the inertial calculation carried out in the second operating mode is used by the computing component 24.3 to carry out the wheel diameter determination mode. In addition, the measurement variables $n_1$ to $n_4$ recorded by the sensor units 18 and preliminary wheel diameter characteristic variables $r'_1$ to $r'_4$ which are read from a memory unit (not shown) are taken into account by the computing component 24.3. The provision of these preliminary wheel diameter characteristic variables $r'_1$ to $r'_4$ is explained further below.

A first module 100 of the computing component 24.3 calculates, on the basis of these characteristic variables, a characteristic variable $s_i$ which is an indicator of an abnormal process of recording the measurement variables $n_i$, for example slip detection:

$$s_i = (n_i 2\pi r'_i - V_{DG})/V_{DG}.$$

If there is a normal recording process for the wheelset 16 corresponding to the measurement variable $n_i$, a second module 101 of the computing component 24.3 updates the wheel diameter characteristic variable $r_i$ assigned to this wheelset 16:

$$r_i = V_{DG}/2\pi n_i.$$

After the wheel diameter characteristic variables $r_i$ have been provided and stored in a memory unit, the inertial calculation is carried out for each chassis unit 14 according to the first operating mode. In this case, as explained above, a reference speed characteristic variable $V_{ref}$ is used by the second computing component 24.2, which reference speed characteristic variable is the result of merging the chassis speed measurement variable $V_{dreh}$ with the global speed characteristic variable $V_{GPS}$, as explained above using FIG. 4.

As already explained above using FIG. 3, the corresponding chassis speed measurement variable $V_{dreh}$ is provided from the measurement variables $n_i$ recorded by the sensor units 18 by including the corresponding wheel diameter characteristic variable $r_i$. In this case, these wheel diameter characteristic variables $r_i$ determined in the wheel diameter determination mode are read from a memory unit and combined with the measurement variables $n_i$.

The provision of the reference speed $V_{ref}$ on the basis of the chassis speed measurement variable $V_{dreh}$, the detection of an abnormal process of providing the chassis speed measurement variable $V_{dreh}$ by the detection unit 30 and the performance of the inertial calculation according to the operating modes are carried out in the manner already described above. During determination of the inertial speed characteristic variable $V_{DG}$, the computing component 24.3 continuously determines the wheel diameter characteristic variables $r_i$ as long as there is no abnormal process of providing the chassis speed measurement variable $V_{dreh}$. However, the wheel diameter characteristic variables $r_i$ determined in the wheel diameter determination mode and stored are still used to determine the inertial speed characteristic variable $V_{DG}$. Long-term monitoring of wheelsets 16 of the rail vehicle 10 can be carried out using the continuously calculated wheel diameter characteristic variables. Wear and tear can be determined and maintenance data can be output. It is also advantageous to determine wear-intensive routes from the development of the wheel diameter characteristic variables. This makes it possible to obtain data for improving route sections. In this case, determined wear and tear can be compared with locating data, with the result that it is possible to carry out an assignment to locations at which increased wear and tear occurs.

The wheel diameter determination mode described above is carried out at defined intervals of time. If a change to this mode is made, performance of the inertial calculation according to the second operating mode, as explained using FIG. 7, is initiated. In addition, the wheel diameter characteristic variables $r_i$ determined last in the continuous determination mode before the change are stored as preliminary wheel diameter characteristic variables $r'_i$. The wheel diameter determination mode is then carried out as described above for the purpose of providing updated wheel diameter characteristic variables $r_i$ on the basis of these wheel diameter characteristic variables $r'_i$.

When the wheel diameter determination mode is carried out for the first time, prestored default values are used as preliminary wheel diameter characteristic variables $r'_i$.

Figure 8:
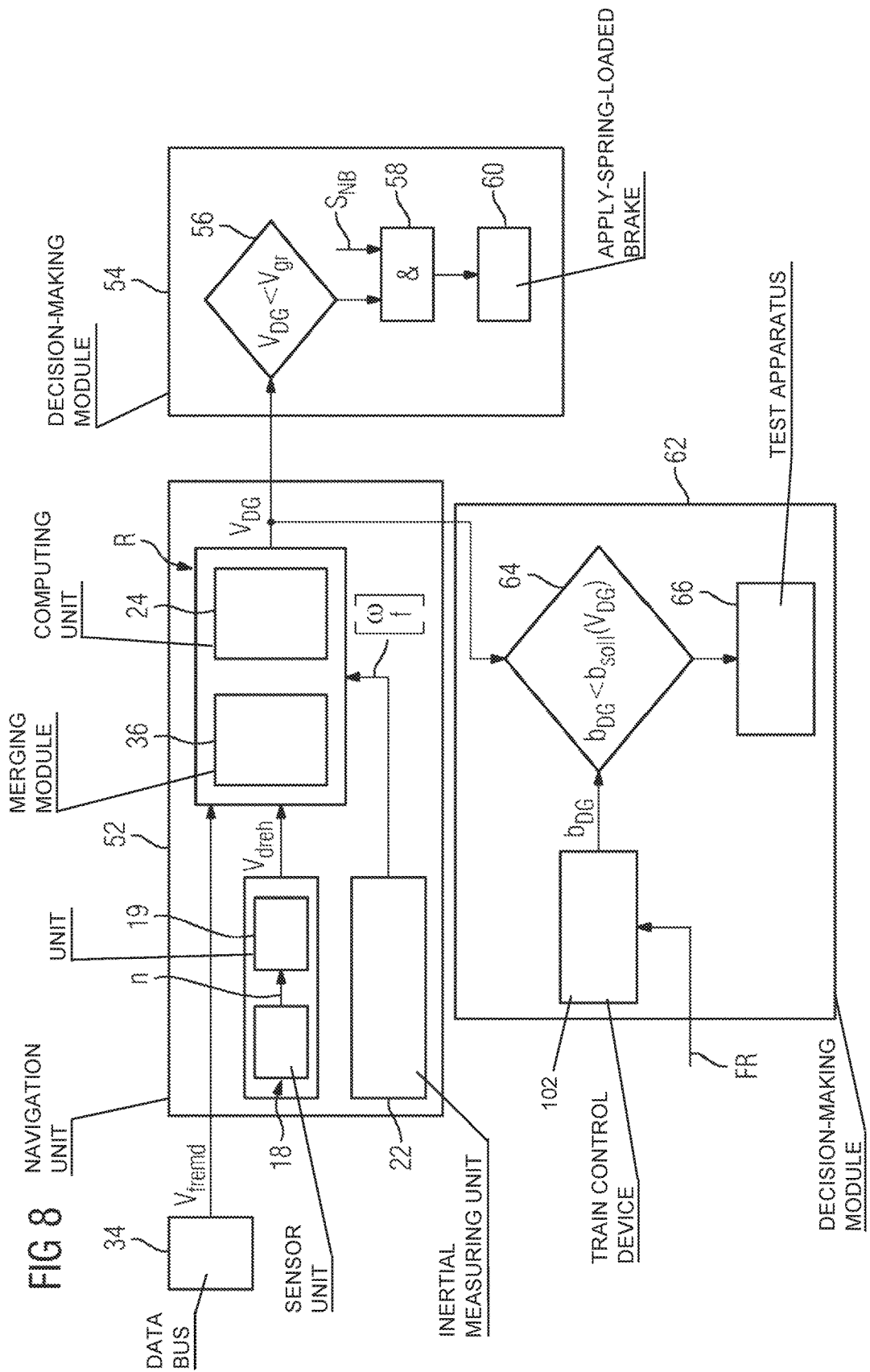
FIG. 8: shows an evaluation method for evaluating a result of the inertial calculation.

One possible evaluation of the inertial speed characteristic variable $V_{DG}$ determined for a chassis unit 14 is explained using FIG. 8.

Said figure illustrates, in particular, the inertial measuring unit 22, sensor unit 18 and computing apparatus R assigned to a particular chassis unit 14. In accordance with the exemplary embodiments described above, the computing apparatus R may possibly have the merging module 36 which merges the chassis speed measurement variable $V_{dreh}$ of the chassis unit 14 with a global speed characteristic variable which may correspond to the characteristic variables $V_\Sigma$ or $V_{GPS}$ described above and is referred to as the characteristic variable $V_{fremd}$. The global speed characteristic variable $V_{fremd}$ provided via the data bus 34. As likewise described above, the computing apparatus R may have one or more computing units 24. A navigation unit 52 which is assigned to the carriage 12 in which the chassis unit 14 considered is situated is formed by at least the sensor unit 18, the inertial measuring unit 22 and the computing apparatus R.

The inertial speed characteristic variable $V_{DG}$ determined is evaluated in at least two respects. If the chassis unit 14 considered is equipped with a braking device different from a drive motor, for example a spring-loaded brake, it may be used by a decision-making module 54 of a brake control system of the rail vehicle 10 which is assigned to the chassis unit 14 considered and decides whether the braking device is intended to be applied for braking until reaching a standstill. This is carried out by means of a comparator 56 and an AND element 58. The inertial speed characteristic variable $V_{DG}$ is compared with a threshold value $V_{gr}$ in the comparator 56. If it is smaller than the threshold value $V_{gr}$, an active signal is passed to the AND element 58. If a signal $S_{NB}$, which is generated if inadequate braking power is produced by the electrodynamic brake formed by at least one drive motor of the chassis unit 14 considered, is likewise applied to said AND element, a decision is made in a step 60 to apply the spring-loaded brake.

The inertial speed characteristic variable $V_{DG}$ can also be used by a further decision-making module 62 of the brake control system, which decision-making module decides—during a braking process carried out using the electrodynamic brake—whether the control of the electrodynamic brake should be tested. This is suitable, in particular, for an electrodynamic brake having at least two redundancy levels. If the test determines that the control of the electrodynamic brake should be considered to be defective, a change to a further redundancy level can be initiated. The decision-making module 62 has a comparator 64 which compares a currently recorded acceleration characteristic variable $b_{DG}$ of the chassis unit 14 with a desired value $b_{soll}(V_{DG})$ at least to be complied with in the braking process for the current inertial speed characteristic variable $V_{DG}$. The acceleration characteristic variable $b_{DG}$ is recorded on the basis of the direction of travel FR communicated by a train control device. If the recorded acceleration characteristic variable $b_{DG}$ is smaller than the desired value $b_{soll}$, a signal is transmitted to a test apparatus 66 which tests the suitability of the control of the electrodynamic brake. In this case, the test is carried out on the basis of at least two further criteria, in which case the test apparatus is in the form of a so-called "2 out of 3 voter". This causes a change between two redundancy levels of the control if at least two of the criteria are satisfied.

The invention claimed is:

1. A method for determining a speed of a rail vehicle equipped with at least one first chassis supporting a carriage of the rail vehicle and for applying a brake of the rail vehicle, the method comprising:
   providing, with a sensor associated with the first chassis, at least one chassis speed measurement variable related to the first chassis;
   recording inertial measurement variables by an inertial measuring unit;
   forming a reference speed characteristic variable based on the chassis speed measurement variable;
   determining an inertial speed characteristic variable by carrying out an inertial calculation with at least one computing unit, at least based on the inertial measurement variables and, during at least one period according to a first operating mode, based on the reference speed characteristic variable in order to estimate a deviation in the inertial calculation;
   determining the inertial speed characteristic variable, by way of the inertial calculation, at least based on the inertial measurement variables and, during at least one period according to a second operating mode, without taking into account the reference speed characteristic variable;
   with a detection unit, detecting an abnormal process of providing the chassis speed measurement variable based on a reference characteristic variable and the chassis speed measurement variable;
   upon detecting the abnormal process of providing the chassis speed measurement variable, carrying out the inertial calculation according to the second operating mode;
   assigning a plurality of computing units to the first chassis, each computing unit being able to respectively carry out the inertial calculation according to the operating modes and providing a result of the inertial calculation at an output;
   assigning a switching apparatus to the computing units, wherein said switching apparatus is selectively connected to one of the outputs in order to provide the inertial speed characteristic variable;
   connecting a respective switching unit, which has a first switching state and a second switching state, upstream of each computing unit, wherein in the first switching state, the switching unit provides the reference speed characteristic variable for the respective computing unit for carrying out the first operating mode and wherein in the second switching state, the switching unit decouples the respective computing unit from the reference speed characteristic variable in order to carry out the second operating mode;
   if an abnormal recording process is not present, matching respective switching cycles of the switching units and a switching cycle of the switching apparatus to one another so that the switching apparatus, during each switching process, establishes a connection to the at least one computing unit which carries out the inertial calculation according to the second operating mode;
   if an abnormal recording process is present, all switching units are switched in the second switching state; and
   applying the brake at least dependent on a magnitude of the inertial speed characteristic variable.

2. The method according to claim 1, which comprises:
   determining, with a first computing component of the computing unit, an estimated value of the inertial speed characteristic variable from the inertial measurement variables;
   with a second computing component of the computing unit which forms a state observer, estimating the deviation in the first operating mode based on the estimated value and the reference speed characteristic variable; and
   using the deviation estimated by the second computing component in the first computing component.

3. The method according to claim 1, wherein, in a first embodiment of the first operating mode, the reference speed characteristic variable corresponds to the chassis speed measurement variable.

4. The method according to claim 2, which comprises operating the state observer in a free propagation mode in the second operating mode.

5. The method according to claim 1, wherein, in a second embodiment of the first operating mode, providing a global speed characteristic variable and forming the reference speed characteristic variable based on the chassis speed measurement variable and the global speed characteristic variable, wherein the global speed characteristic variable is based on dynamics of an entire rail vehicle.

6. The method according to claim 2, which comprises, in the second operating mode, estimating the deviation with the second computing component based on the global speed characteristic variable.

7. The method according to claim 5, which comprises providing the global speed characteristic variable at least on a basis of an averaging of speed characteristic variables of a plurality of chassis each different from the first chassis.

8. The method according to claim 5, wherein the rail vehicle has a global recording apparatus which is different from the inertial measuring unit and which provides the global speed characteristic variable.

9. The method according to claim 5, which comprises providing a merging module implementing a Kalman filter, supplying the global speed characteristic variable and the chassis speed measurement variable to the merging module, and obtaining the reference speed characteristic variable from the merging module.

10. The method according to claim 6, wherein the switching units, in the second switching state thereof, provide the global speed characteristic variable for the respective computing unit for carrying out the second operating mode.

11. The method according to claim 1, which comprises, if an abnormal recording process is not present, matching the switching cycles of the switching units and the switching cycle of the switching apparatus to one another so that the switching apparatus, during each switching process, establishes a connection to one of the computing units which has been carrying out the inertial calculation according to the second operating mode at least for a predetermined time.

12. The method according to claim 6, which comprises, in a wheel diameter determination mode, carrying out the inertial calculation according to the second operating mode for determining the inertial speed characteristic variable, and determining at least one wheel diameter characteristic variable of the chassis at least based on the inertial speed characteristic variable determined in the second operating mode.

13. The method according to claim 12, which comprises, in the inertial calculation according to the first operating mode following the wheel diameter determination mode, providing the chassis speed measurement variable by taking into account the wheel diameter characteristic variable determined in the wheel diameter determination mode.

14. The method according to claim 1, wherein the chassis is a bogie.

15. The method according to claim 1, which comprises providing a global reference speed characteristic variable to the computing unit instead of the reference speed characteristic variable in the second operating mode.

16. The method according to claim 1, wherein the step of applying the brake is also dependent on braking power applied by at least one drive motor of the rail vehicle.

* * * * *